(12) United States Patent
Sakugawa et al.

(10) Patent No.: US 9,026,823 B2
(45) Date of Patent: May 5, 2015

(54) DATA PROCESSING DEVICE AND DATA PROCESSING SYSTEM WITH WIDE VOLTAGE RANGE OPERATION MODE

(75) Inventors: Mamoru Sakugawa, Kawasaki (JP); Masamichi Fujito, Kawasaki (JP); Jun Setogawa, Kawasaki (JP); Masaru Takahashi, Kawasaki (JP); Shinsuke Yoshimura, Kawasaki (JP)

(73) Assignee: Renesas Electronics Corporation, Kanagawa-shi, Kanagawa (JP)

( * ) Notice: Subject to any disclaimer, the term of this patent is extended or adjusted under 35 U.S.C. 154(b) by 276 days.

(21) Appl. No.: 13/816,479

(22) PCT Filed: Aug. 26, 2010

(86) PCT No.: PCT/JP2010/064504
§ 371 (c)(1),
(2), (4) Date: Feb. 11, 2013

(87) PCT Pub. No.: WO2012/026024
PCT Pub. Date: Mar. 1, 2012

(65) Prior Publication Data
US 2013/0145190 A1    Jun. 6, 2013

(51) Int. Cl.
*G06F 1/32* (2006.01)
(52) U.S. Cl.
CPC .............. *G06F 1/324* (2013.01); *G06F 1/3296* (2013.01); *G06F 1/3206* (2013.01)
(58) Field of Classification Search
CPC ................................. G06F 1/324; G06F 1/3296
USPC ......................................................... 713/322
See application file for complete search history.

(56) References Cited

U.S. PATENT DOCUMENTS 5,444,664 A    8/1995    Kuroda et al.
5,511,013 A    4/1996    Tokieda et al.
(Continued)

FOREIGN PATENT DOCUMENTS

JP    7-028549 A    1/1995
JP    7-029386 A    1/1995
(Continued)

OTHER PUBLICATIONS

International Search Report in PCT/JP2010/064504 dated Nov. 22, 2010(English Translation Thereof).
(Continued)

*Primary Examiner* — Albert Wang
(74) *Attorney, Agent, or Firm* — McGinn IP Law Group, PLLC.

(57) ABSTRACT

A central processing unit sets which of the following modes a data processing device is to operate in accordance with a user program. The high-speed operation mode allows operation within a first range in which an external supply voltage is relatively high. The wide voltage range operation mode allows operation within a second range in which the external supply voltage includes the first range and a relatively low voltage range, and an upper limit of a frequency of the first clock in the wide voltage range operation mode is lower than an upper limit of a frequency of the first clock in the high-speed operation mode. The frequency of the first clock in the low power consumption operation mode is lower than the frequency of the first clock in the high-speed operation mode and the frequency of the first clock in the wide voltage range operation mode.

8 Claims, 5 Drawing Sheets

(56) References Cited

U.S. PATENT DOCUMENTS

| | | |
|---|---|---|
| 2002/0041527 A1 | 4/2002 | Tanaka et al. |
| 2003/0206451 A1 | 11/2003 | Tanaka et al. |
| 2004/0057324 A1 | 3/2004 | Abe et al. |
| 2005/0265114 A1 | 12/2005 | Tanaka et al. |
| 2010/0117697 A1 | 5/2010 | Kanno et al. |
| 2010/0169701 A1* | 7/2010 | Tu .................................. 713/600 |
| 2011/0320835 A1* | 12/2011 | Browning ..................... 713/320 |
| 2012/0187993 A1 | 7/2012 | Kanno et al. |

FOREIGN PATENT DOCUMENTS

| | | |
|---|---|---|
| JP | 11-086569 A | 3/1999 |
| JP | 2000-315127 A | 11/2000 |
| JP | 2002-109894 A | 4/2002 |
| JP | 2003-256069 A | 9/2003 |
| JP | 2004-070805 A | 3/2004 |
| JP | 2010-063057 A | 3/2010 |
| JP | 2010-118746 A | 5/2010 |

OTHER PUBLICATIONS

Intel (R) Corporation, "Enhanced Intel (R) SpeedStep(R) Technology for the Intel (R) Pentium(R)M Processor", White Paper, Intel (R) Corporation, Mar. 2004, p. 7 Table1.4, URL http://download.intel.com/design/network/papers/30117401.pdf.

* cited by examiner

DATA PROCESSING DEVICE AND DATA PROCESSING SYSTEM WITH WIDE VOLTAGE RANGE OPERATION MODE

TECHNICAL FIELD

The present invention relates to a data processing device and a data processing system, and more particularly to a data processing device including a central processing unit, and a data processing system using the data processing device.

BACKGROUND ART

In addition to voice communication, data communication via connection to a network such as the Internet has become a main function of a mobile phone.

When performing voice communication, a central processing unit (CPU) provided in a mobile phone converts voice into digital information and transmits the digital information to a base station. Further, central processing unit CPU receives digital information from the base station and executes codec processing for converting the received digital information into voice.

On the other hand, when performing data communication, the CPU executes codec processing for expanding digital information, including compressed information of a still image, a moving image and the like, received from the base station and an access point of WI-FI (registered trademark), and storing the expanded digital information in a non-volatile memory or providing a view of a moving image and the like.

Such mobile equipment as represented by a mobile phone is driven by a battery. Therefore, it is required to have a longer battery run time.

Therefore, during a standby period, a data processing device of a baseband processing unit which performs wireless communication operates intermittently to communicate with a base station and the like. Further, a data processing device of an application processing unit lowers the frequency of a clock supplied to an internal functional block and stops the supply, and lowers the supply of the voltage and stops the supply (refer to PTL 1 and PTL 2).

Further, a flash memory is generally used as a non-volatile memory adopted in such a data processing device. As a measure to lower electric power consumption in this flash memory, electric power consumption at the time of performing writing operation is reduced (refer to PTL 3).

CITATION LIST

Patent Literature

PTL 1: Japanese Patent Laying-Open No. 7-28549
PTL 2: Japanese Patent Laying-Open No. 2010-118746
PTL 3: Japanese Patent Laying-Open No. 2002-109894

SUMMARY OF INVENTION

Technical Problem

According to the technology for lowering electric power consumption as disclosed in PTL 1, decisions and timings for supplying a clock and a power supply voltage to each internal functional block must be defined by description of a program executed by a data processing device. Therefore, there is a problem that the number of program steps for such a setting increases so that the code efficiency of the program for performing effective operation is deteriorated.

According to the DVFS (Dynamic Voltage and Frequency Scaling) control technology as disclosed in PTL 2, a clock and a power supply voltage supplied to an internal functional block is modified in accordance with the state of operation of a data processing device, thus a monitoring circuit for monitoring the state of the internal functional block is required. Therefore, there is a problem that the overhead increases in the circuit scale of the monitoring circuit and in the consumed electric power. Further, there is a problem that it creates difficulty in estimating the amount of electric power that should be supplied to the data processing device at the time of designing the equipment since significant increase and decrease of the amount of consumed electric power occurs in the data processing device.

When providing a view of a moving image by a mobile phone, it is required that the baseband processing unit receives data with high quality. However, since this matter is strongly dependent on the intensity of a radio wave transmitted from a transmitter side such as a base station, it is not quite dependent on the state of operation of the baseband processing section itself On the other hand, the application processing unit is required to appropriately complete processing such as expansion of received data, imaging and vocalization of data, and providing display and sound within a predetermined time. Further, when recording such a moving image, writing to the non-volatile memory must also be completed within a predetermined time.

On the other hand, when performing verbal communication by a mobile phone, the processing executed by the baseband processing unit is not significantly different from the processing for providing a view of a moving image. Meanwhile, the application processing unit performs expansion, vocalization, and sound production with respect to data having a less amount as compared to the case of providing a view of a moving image. Even though the amount of data processing is smaller as compared to the case of providing a view of a moving image, in order to enable a phone call for a long time, it is required that the data processing can be continued even when the supply voltage of the battery is lowered.

Hence, an object of the present invention is to provide a data processing device and a data processing system allowing easy setting for the operation voltage and clock frequency of the data processing device and for the writing operation with respect to the non-volatile memory involving significant electric power consumption in accordance with the state of operation of equipment using the data processing device.

Solution to Problem

A data processing device in accordance with one embodiment of the present invention includes a central processing unit operating in accordance with a user program, a register which can be set by a user, a non-volatile memory, and a first clock circuit for supplying a first clock to the central processing unit and the non-volatile memory. The central processing unit sets in the register which of a first mode, a second mode, and a third mode the data processing device is to operate in accordance with the user program. The first mode allows operation within a first range in which an external supply voltage is relatively high. The second mode allows operation within a second range in which the external supply voltage includes the first range and a relatively low voltage range. An upper limit of a frequency of the first clock in the second mode is lower than an upper limit of a frequency of the first clock in the first mode. The third mode is a low electric power consumption operation mode, and a frequency of the first clock in the third mode is lower than the frequency of the first clock in the first mode and the frequency of the first clock in the second mode.

Advantageous Effects of Invention

According to one embodiment of the present invention, the operation voltage and clock frequency of the data processing device and the writing operation with respect to the non-volatile memory involving significant electric power consumption can be set easily in accordance with the state of operation of equipment using the data processing device.

DESCRIPTION OF EMBODIMENT

In the embodiment of the present invention, an example of a data processing device including a central processing unit CPU and a non-volatile memory for use in mobile equipment such as a mobile phone will be described in which operation modes of the data processing device are set taking into account the state of operation of the equipment so as to achieve reduction of the amount of electric power consumption and extension of operable time.

In the following, embodiments of the present invention will be described with reference to the drawings.

[First Embodiment]

Figure 1:
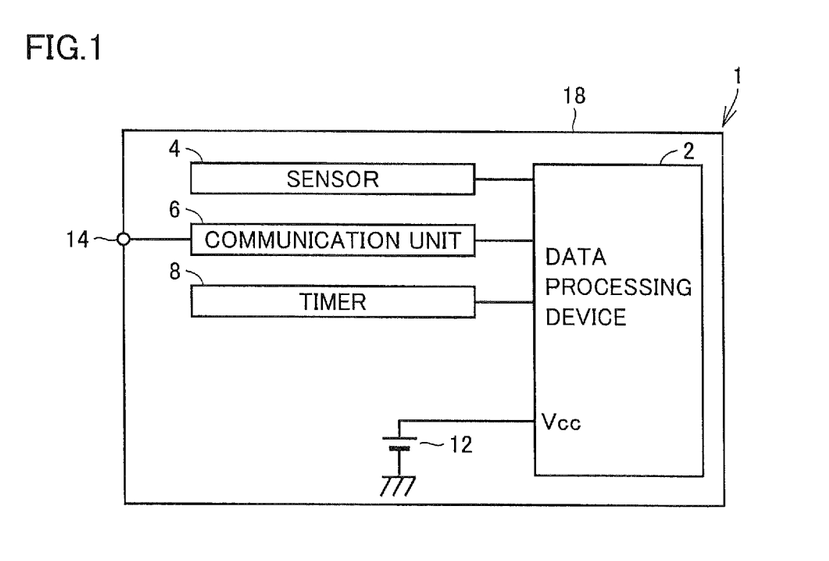
FIG. 1 represents an example of a data processing system including a data processing device.

FIG. 1 represents an example of a data processing system including a data processing device.

Referring to FIG. 1, a data processing system 1 includes a printed circuit board 18, a data processing device 2 provided on printed circuit board 18, a sensor 4, a communication unit 6, a timer 8, and a battery 12. The voltage of battery 12 is supplied as a power supply voltage Vcc to data processing device 2.

Figure 2:
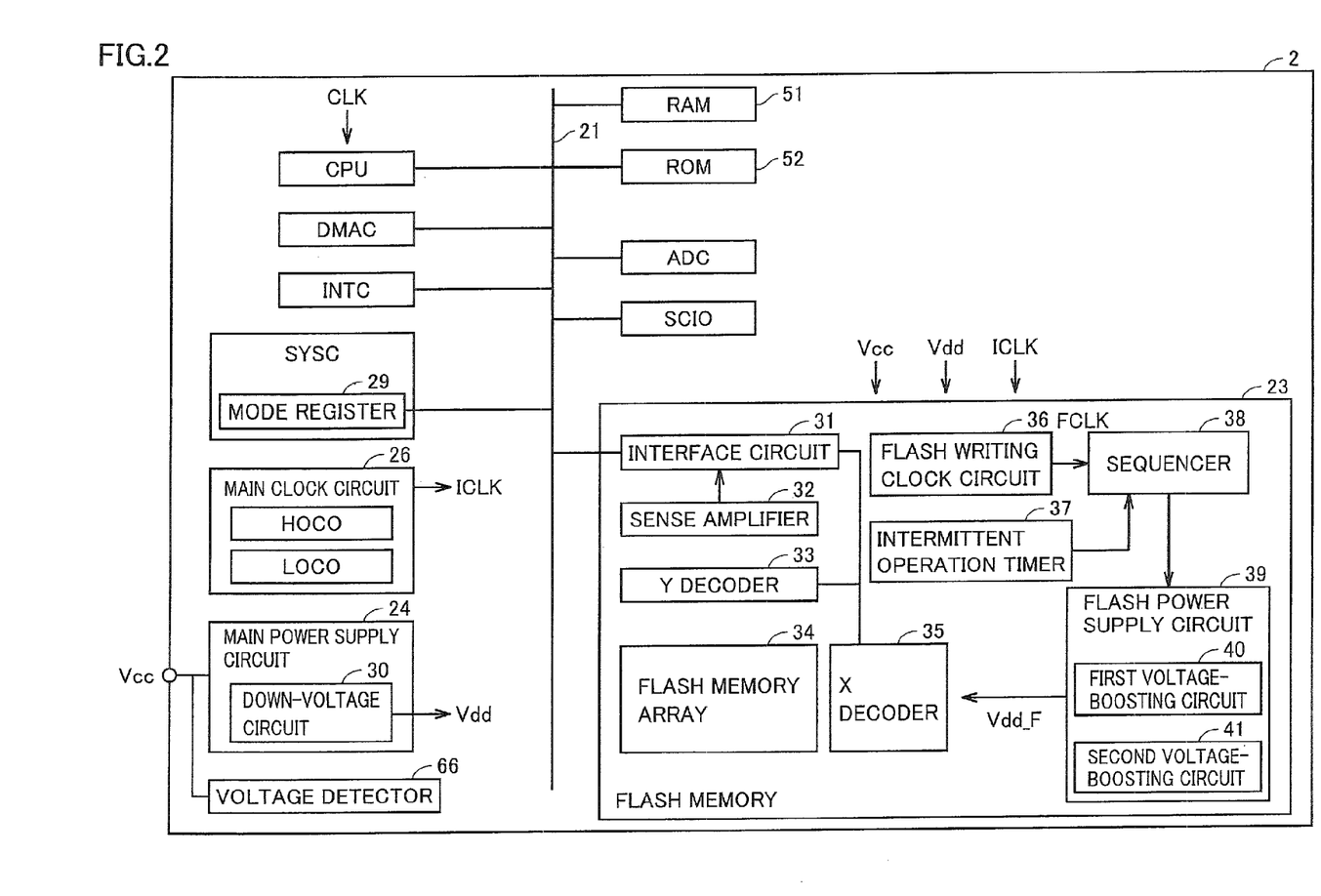
FIG. 2 represents a schematic configuration of the data processing device including a central processing unit.

FIG. 2 represents a schematic configuration of the data processing device including a central processing unit (CPU). In addition to the general configuration of a microcomputer, FIG. 2 shows a functional unit particular to the present invention.

Referring to FIG. 2, data processing device 2 includes central processing unit CPU, a RAM (Random Access Memory) 51, a ROM (Read Only Memory) 52, a flash memory 23, a bus 21 transferring data and address, a data transfer unit (direct memory access controller) DMAC, an analog-digital converter ADC, an interruption controller INTC, a serial communication unit SCIO, a system controller SYSC, a main clock circuit 26, a main power supply circuit 24, and a voltage detector 66.

Central processing unit CPU sequentially executes a program stored in flash memory 23 to control entire operation of data processing device 2. Central processing unit CPU sets data processing device 2 to operate in any of a high-speed operation mode, a wide voltage range operation mode, and a low electric power consumption operation mode.

System controller SYSC controls entire operation of the data processing device.

Serial communication unit SCIO stores externally applied data in RAM 51.

Analog-digital converter ADC converts an externally applied analog signal into a digital value and stores the value in RAM 51.

Data transfer unit DMAC controls data transfer through bus 21 when storing the digital data of serial communication unit SCIO and analog-digital converter ADC in RAM 51.

Interruption controller INTC receives an interruption signal issued by an external or internal functional unit and issues interruption with respect to central processing unit CPU. Central processing unit CPU executes processing in accordance with the content of interruption.

Main clock circuit 26 includes a plurality of clock sources having a low-speed oscillator LOCO and a high-speed oscillator HOCO. Main clock circuit 26 generates an operation clock ICLK for data processing device 2.

A main power supply circuit 24 down-converts or boosts the external supply voltage Vcc and supplies the voltage to each element in the data processing device. Main power supply circuit 24 includes a voltage-down circuit 30 which down-converts the external power supply voltage Vcc to generate an internal operation voltage Vdd and supplies the voltage to central processing unit CPU and the like.

Voltage detector 66 detects a value of the external power supply voltage Vcc.

Flash memory 23 includes a flash memory array 34, an interface circuit 31, a sense amplifier 32, a Y decoder 33, an X decoder 35, a flash power supply circuit 39, a sequencer 28, a flash writing clock circuit 36, and an intermittent operation timer 37.

Flash memory array 34 has a plurality of flash memory cells arranged in a matrix.

Interface circuit 31 receives an address and write data (program data) of flash memory array 34 from central processing unit CPU through bus 21 and outputs read data from flash memory array 34 to central processing unit CPU through bus 21.

Sense amplifier 32 compares a signal read from flash memory array 34 with a reference signal to output read data.

Y decoder 33 decodes a column address and selects a column subject to reading, programming, or erasing in flash memory array 34.

X decoder 35 decodes a row address and selects a row subject to reading, programming, or erasing in flash memory array 34.

Flash power supply circuit 39 includes a first voltage-boosting circuit 40 and a second voltage-boosting circuit 41.

At the time of erasing, the amount of consumed current is great. Therefore, first voltage-boosting circuit 40 and second voltage-boosting circuit 41 operate in parallel to enhance the supply capacity.

At the time of programming, only first voltage-boosting circuit 40 operates. This is because the amount of consumed current at the time of programming is so small that operation of two voltage-boosting circuits will cause the supply capacity to be too high, resulting in deterioration of the write characteristic. However, first voltage-boosting circuit 40 and second voltage-boosting circuit 41 may be configured to operate in parallel at the time of starting the power supply for the purpose of attaining a programmable state as quickly as possible at the time of programming.

In the high-speed operation mode which will be described below, the number of stages in a charge pump for boosting in first voltage-boosting circuit 40 and second voltage-boosting circuit 41 is greater as compared to the number in the wide voltage range operation mode.

Sequencer 38 controls reading from flash memory array 34 based on a clock ICLK supplied from main clock circuit 26, and controls programming and erasing with respect to flash memory array 34 based on a clock FCLK supplied from flash writing clock circuit 36.

Since the driving ability of the transistor becomes high when operation is performed with a high voltage at the time of reading data from flash memory array 34, sequencer 38 performs reading at a high speed by expediting the timing of reading from flash memory array 34. On the other hand, when operation is performed with a low voltage, sequencer 38 performs reading at a low speed by easing the timing of reading from flash memory array 34.

Flash writing clock circuit 36 outputs a clock FCLK for controlling the timing of programming and erasing with respect to flash memory array 34. Such a unique flash writing clock circuit 36 is provided because performing the programming and erasing operation with a clock ICLK having a significant change in operation frequency in accordance with modes causes variation in voltage application time with respect to a memory space of flash memory array 34 and in turn causes variation in the reliability of cells. However, since flash writing clock circuit 36 consumes a great amount of current, operation is performed only at the time of programming and erasing, and flash writing clock circuit 36 is stopped at the time of performing reading operation which dominates under the use environment, so that low electric power consumption is achieved.

Intermittent operation timer 37 outputs a signal notifying elapse of a predetermined time to sequencer 38 at predetermined time intervals to allow flash power supply circuit 39 to operate intermittently at predetermined time intervals when performing operation of reading from flash memory 23 in the low electric power operation mode.

Referring to FIG. 1 and FIG. 2, sensor 4 generates an analog signal applied to analog-digital converter ADC.

Communication unit 6 controls data communication with elements provided outside the system and applies data to serial communication unit SCIO or receives data from serial communication unit SCIO.

Timer 8 issues an interruption signal with respect to data processing device 2 in accordance with elapse of time set by data processing device 2.

Data processing device 2 is supplied with operation power supply voltage Vcc from an externally connected battery.

In a system having such a configuration, the degree of deterioration of a battery (lowering of the electromotive force in the case of a primary battery, and lowering of the current supply capacity due to lowering of the power storage capacity by repeated charging and discharging) affects stability in operation of data processing device 2.

(As to Operation Mode)

Data processing device 2 operates in any of the high-speed operation mode, the wide voltage range operation mode, and the low electric power consumption operation mode. Central processing unit CPU sets the operation mode of data processing device 2 in mode register 29 in accordance with a user program. System controller SYSC controls operation of data processing device 2 in accordance with the operation mode set in mode register 29.

Figure 3:
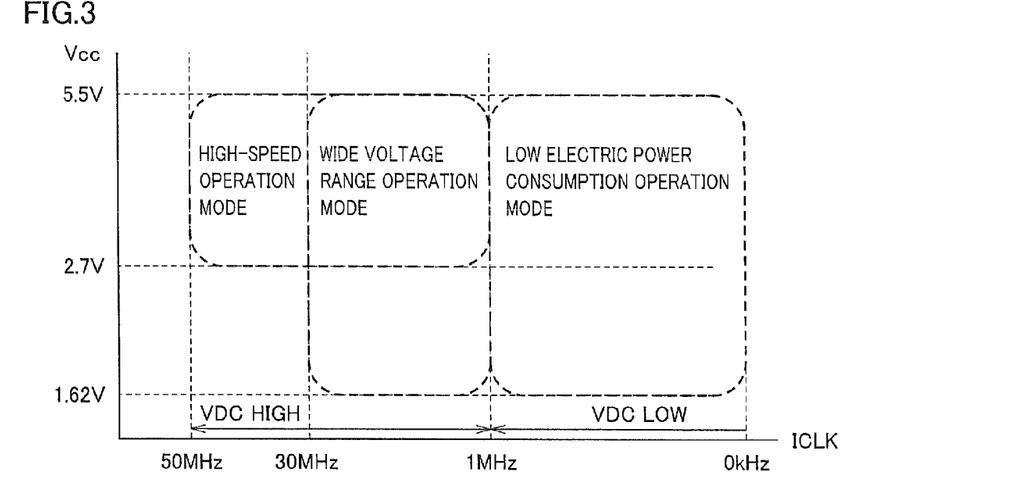
FIG. 3 represents a range of an external supply voltage required for operation of the central processing unit and a frequency range of a clock supplied to the central processing unit in each operation mode of the data processing device.

FIG. 3 represents a range of the external supply voltage required for operation of central processing unit CPU and a frequency range of a clock supplied to central processing unit CPU in each operation mode of the data processing device.

Figure 4:
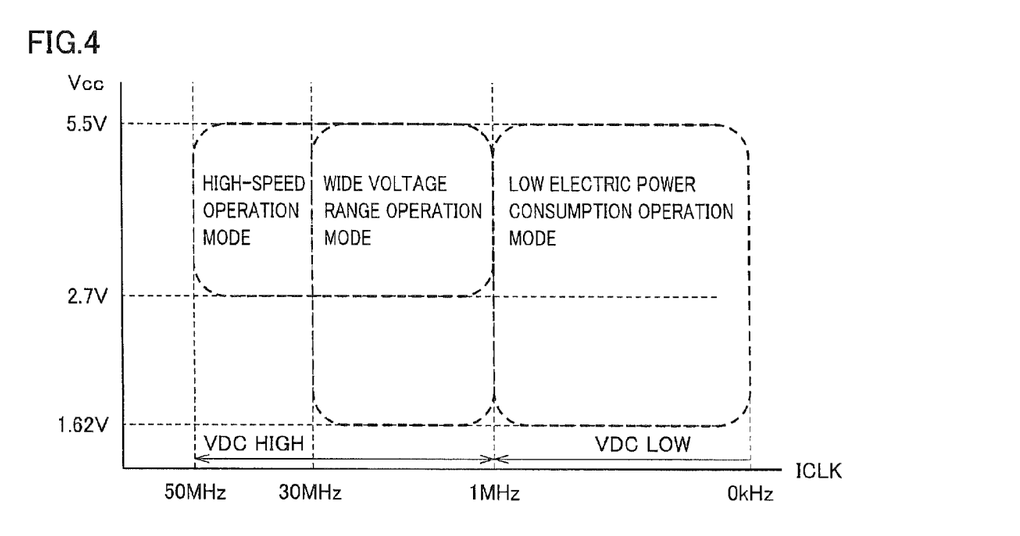
FIG. 4 represents a range of the external supply voltage required at the time of reading from a flash memory and a frequency range of a clock supplied to the flash memory at the time of reading in each operation mode of the data processing device.

FIG. 4 represents a range of the external supply voltage required at the time of reading from flash memory 23 and a frequency range of a clock supplied to flash memory 23 at the time of reading in each operation mode of the data processing device.

Figure 5:
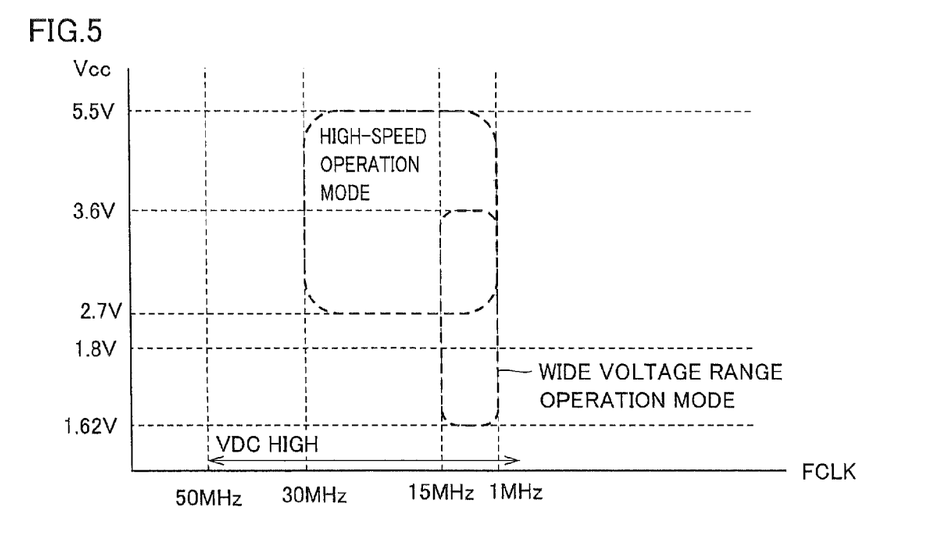
FIG. 5 represents a range of the external supply voltage required at the time of programming and erasing with respect to the flash memory and a frequency range of a clock supplied to the flash memory at the time of programming and erasing in each operation mode of the data processing device.

FIG. 5 represents a range of the external supply voltage required at the time of programming and erasing with respect to flash memory 23 and a frequency range of a clock supplied to flash memory 23 at the time of programming and erasing in each operation mode of the data processing device.

(1) High-Speed Operation Mode

The high-speed operation mode is a mode which is set when relatively high speed data processing such as providing a view of a moving image by mobile equipment is required.

As shown in FIG. 3 and FIG. 4, the data processing device requires the supply of relatively high external supply voltage Vcc (the first range of 2.7V-5.5V) at the time other than programming and erasing with respect to flash memory 23. As shown in FIG. 5, the data processing device requires the supply of external supply voltage Vcc in the range of 2.7V-5.5V at the time of programming and erasing with respect to flash memory 23.

In the high-speed operation mode, all of the power supply circuits including main power supply circuit 24 and flash power supply circuit 39 operate.

As shown in FIG. 3, in the high-speed operation mode, central processing unit CPU is supplied with a clock ICLK in the range of 1 MHz-50 MHz from main clock circuit 26.

As shown in FIG. 4, in the high-speed operation mode, flash memory 23 is supplied with a clock ICLK, which is the same as the clock supplied to central processing unit CPU, from main clock circuit 26 at the time of reading.

As shown in FIG. 5, in the high-speed operation mode, flash memory 23 operates with a clock FCLK in the range of 1 MHz-30 MHz at the time of programming and erasing. The clock FCLK is generated in flash writing clock circuit 36.

(2) Wide Voltage Range Operation Mode

The wide voltage range operation mode is a mode which is set when data processing is executed at a relatively low speed while operation is performed for a long time and in the wide voltage range encompassing the lowering of the voltage supply from a battery, as in the case of performing a verbal communication by mobile equipment.

As shown in FIG. 3 and FIG. 4, at the time other than programming and erasing with respect to flash memory 23, data processing device 2 requires the supply of external supply voltage Vcc (the second range of 1.62V-5.5V). The second range (1.62V-5.5V) includes the first range (2.7V-5.5V) and a relatively low voltage range.

As shown in FIG. 5, at the time of programming and erasing with respect to flash memory 23, the data processing device requires the supply of external supply voltage Vcc in the range of 1.62V-3.6V. In other words, the range of external supply voltage at the time of programming and erasing is included in the range of external supply voltage at the time of reading (second range).

In the rewriting operation with respect to flash memory 23, the external power supply voltage Vcc is supplied to voltage-boosting circuits 40, 41 in the flash power supply circuit. In the wide voltage range operation mode, the external power supply voltage Vcc includes the low voltage range, thus the voltage-raising capacity of voltage-boosting circuits 40, 41 is set high (increasing the number of steps in the charge pump). However, when the voltage-boosting capacity of voltage-boosting circuits 40, 41 is high, high external power supply voltage Vcc causes a ripple of the voltage boosted by voltage-boosting circuits 40, 41 to be great, leading to variation in the rewriting property of flash memory 23. For such a reason, in the wide voltage range operation mode, the upper limit of the external power supply voltage Vcc is set to be 3.6V which is lower than the high-speed operation mode.

In the wide voltage range operation mode, similarly to the high-speed operation mode, all of the power supply circuits including main power supply circuit 24 and flash power supply circuit 39 operate.

As shown in FIG. 3, central processing unit CPU is supplied with a clock ICLK in the range of 1 MHz-30 MHz from main clock circuit 26.

As shown in FIG. 4, at the time of reading, flash memory 23 is supplied with a clock ICLK, which is the same as the clock supplied to central processing unit CPU, from main clock circuit 26.

The operation frequency of central processing unit CPU and flash memory 23 in the wide voltage range operation mode at the time of reading partially overlaps with the operation frequency of central processing unit CPU and flash memory 23 in the high-speed operation mode at the time of reading, but the upper limit of the operation frequency of central processing unit CPU and flash memory 23 at the time of reading is higher in the high-speed operation mode than in the wide voltage range operation mode.

The reason why the upper limit of the operation frequency in the wide voltage range mode is set to be lower than the upper limit of the operation frequency in the high-speed operation mode will be described.

During the reading operation with respect to flash memory 23, the external voltage Vcc is used in the transistor for applying 0V to the source voltage of flash memory 23. Although operation is allowed even in the case of low external supply voltage Vcc in the wide voltage range operation mode, the current flowing to the transistor becomes small when external supply voltage Vcc is low. Therefore, it is required to extend the sense time in the sense amplifier 32. To accommodate with the long sense time, the upper limit of the operation frequency in the wide voltage range operation mode is set to be lower than the upper limit of the operation frequency in the high-speed operation mode. Further, taking into account that reading from flash memory 23 is operated in a normal manner in the case of high external power supply voltage Vcc even when the sense time is set to be long and the upper limit of operation frequency is limited to 30 MHz, external power supply voltage Vcc to the extent of the high voltage (5.5V) is included.

To accommodate the long sense time, another method of increasing the frequency of waiting without lowering the upper limit of the operation frequency is conceivable. However, in the embodiment of the present invention, the method of increasing the frequency of waiting was not employed in order to maintain the cycle performance. In the operation of central processing unit CPU, the increase in the frequency of waiting in the reading operation with respect to flash memory 23 may cause increase in unnecessary electric power consumption in central processing unit CPU, and will not comply with the purpose of the wide voltage range operation mode enabling operation in a wide voltage range.

As shown in FIG. 5, at the time of programming and erasing, flash memory 23 operates with the clock FCLK in the range of 1 MHz-15 MHz. The clock FCLK is generated in flash writing clock circuit 36.

(3) Low Electric Power Consumption Operation Mode

The low electric power consumption operation mode is a mode which is set when performing low-speed data processing, as in the standby state of mobile equipment.

As shown in FIG. 3 and FIG. 4, the data processing device requires the supply of external supply voltage Vcc (wide range of 1.62V-5.5V).

As shown in FIG. 3, central processing unit CPU is supplied with a clock ICLK in the range of 0 kHz-1 MHz from main clock circuit 26.

As shown in FIG. 4, at the time of reading, flash memory 23 is supplied with the clock ICLK, which is the same as the clock supplied to central processing unit CPU, from main clock circuit 26.

The reason why operation at low speed is allowed even when the external supply voltage Vcc is high in the low electric power consumption operation mode to enable operation for a long period of time (for example, one year) without having to replace the battery when the external power supply voltage Vcc is obtained from the battery.

Further, in the low electric power consumption operation mode, programming and erasing with respect to flash memory 23 are not performed.

In the low electric power consumption operation mode, the supply capacity of the power supply circuit is set to be lower than that in the high-speed operation mode and the wide voltage range operation mode. Specifically, in the low electric power consumption operation mode, only half of the power supply circuits (regulators) are to be operated among the power supply circuits (regulators) in the data processing device. This takes into account the fact that setting the electric power supply capacity of the power supply circuit to be high causes wasteful electric power consumption since a writing operation with respect to flash memory 23 is not performed and the entire data processing device is operated in a low speed in the low electric power consumption operation mode.

Further, in the low electric power consumption operation mode, at the time of reading from flash memory 23, low electric power consumption is achieved by intermittently operating flash electric power supply circuit 39. In other words, flash electric power supply circuit 39 is started with the reading request as a trigger, and the reading is performed after the voltage becomes stable. After the reading is completed, flash electric power supply circuit 39 is stopped again. Sequencer 38 receives the timing from intermittent operation timer 37 to control such intermittent operation.

(Selection of Electric Power Supply)

The arrangement of a plurality of electric power supply circuits in a distributed manner in data processing device 2 can shorten the power supply wiring in the data processing device, as compared to the case of supplying electric power from a single electric power supply circuit. Electric power loss due to resistance of the electric power supply wiring can be suppressed, and the electric power supply capacity in accordance with the state of operation can be controlled by the number of electric power supply circuit operated.

Figure 6:
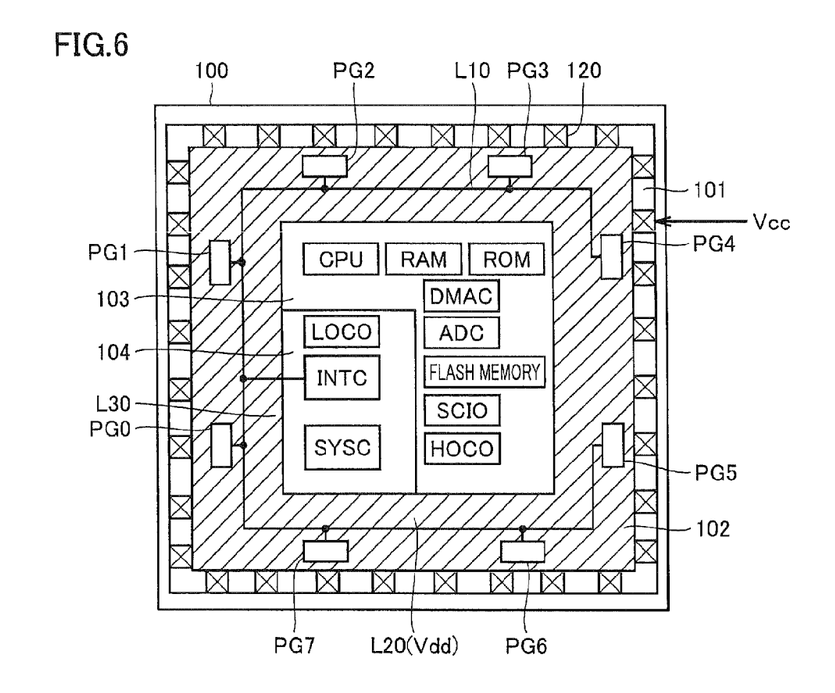
FIG. 6 represents an example of arrangement of the power supply circuit (regulator) in the data processing device.

FIG. 6 represents an exemplary arrangement of the electric power supply circuit (regulators) in the data processing device 2.

Referring to FIG. 6, data processing device 2 is provided on a semiconductor substrate 100. Semiconductor substrate 100 includes a first region 101, a second region 102, a third region 103, and a fourth region 104.

First region 101 is the region for arranging a plurality of external terminals such as pad electrodes 120 related to input and output with external elements such as signals and power supply. Second region 102 is provided in contact with first region 101. Second region 102 is the region for arranging a buffer and a protective element related to input and output of signal and electric power supply with the external element of semiconductor substrate 100. Second region 102 is provided with a constant width so as to extend along the sides on the chip. The constant width is defined substantially depending on the size of the buffer and the protective element related to input and output.

Third region 103 is a region for arranging internal circuits, such as CPU, a memory and some peripheral circuits. The operation of the internal circuits arranged on third region 103 is stopped in the low consumed electric power mode when no operation is required. Fourth region 104 is the region for arranging internal circuits such as system controller SYSC, interruption controller INTC, and low-speed oscillator LOCO. Operation of these circuits is maintained even in the low consumed electric power mode.

A plurality of regulators PG0-PG7 are arranged in a distributed manner using regions of second region 102 where the buffer and protective element are not arranged. As shown in FIG. 2, regulators PG0-PG7 are included in main power supply circuit 24 and flash power supply circuit 39. Among illustrated regulators PG0-PG7, regulators PG0, PG1, PG6, and PG7 supply electric power in all of the modes. These regulators supply electric power to a functional unit such as interruption controller INTC which is required to operate even in the low electric power consumption state. Among the regulators PG0-PG7, regulators PG2, PG3, PG4, and PG5 supply electric power only in the high speed operation mode and the wide voltage range operation mode.

(Operation of Mobile Equipment)

Figure 7:
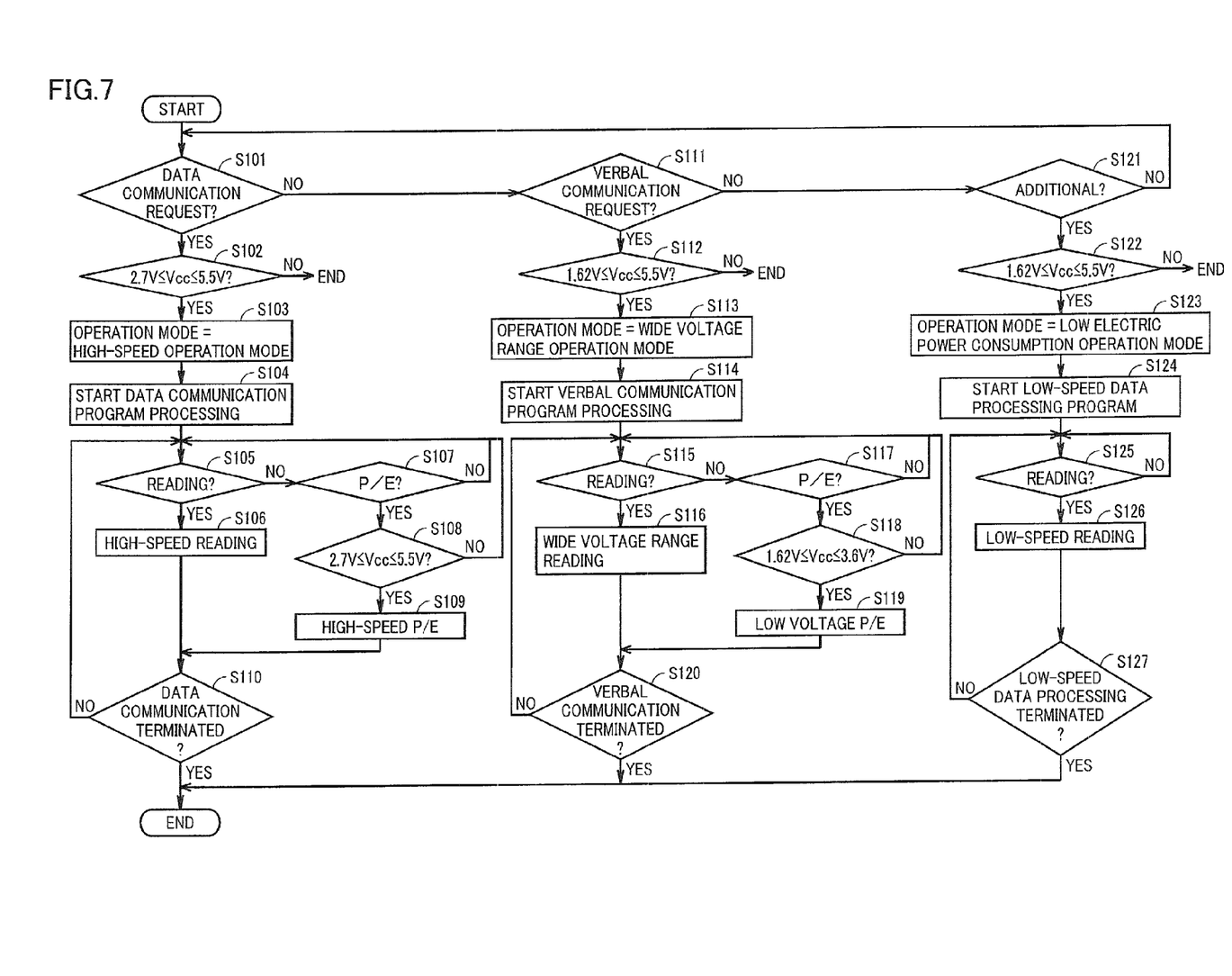
FIG. 7 is a flowchart representing the operation procedure of mobile equipment including the data processing device of FIG. 2.

FIG. 7 is a flowchart representing operation procedures of mobile equipment including the data processing device of FIG. 2.

As in FIG. 7, when data processing device 2 receives a data communication request from a user (YES in step S101), and the external supply voltage Vcc detected by voltage detector 66 is in the range equal to or greater than 2.7V and equal to or less than 5.5V (YES in step S102), central processing unit CPU sets the "high-speed operation mode" in mode register 29 (step S103).

Further, central processing unit CPU starts executing the processing defined by the data communication program. System controller SYSC allows a clock ICLK having a frequency within the range of 1 MHz-50 MHz defined by the data communication program to be supplied from main clock circuit 26 to central processing unit CPU, flash memory 23, and the like (step S104).

When the processing defined by the data communication program is the reading of data from flash memory 23 (YES in step S105), central processing unit CPU performs the high speed reading in the "high-speed operation mode". In other words, the reading is performed with the clock ICLK in the range of 1 MHz-50 MHz (step S106).

When the processing defined by the data communication program is data programming or data erasing with respect to flash memory 23 (YES in step S107), and only when the external supply voltage Vcc detected by voltage detector 66 is within the range equal to or greater than 2.7V and equal to or less than 5.5V (YES in step S108), sequencer 38 performs high-speed programming or high speed erasing in the "high-speed operation mode". In other words, the programming or erasing is performed with the clock FCLK in the range of 1 MHz-30 MHz (step S109).

Central processing unit (CPU) repeatedly executes the processing from step S105 until the data communication program is terminated (YES in step S110).

When data processing device 2 receives a vocal communication request from a user (YES in step S111), and the external supply voltage Vcc detected by voltage detector 66 is within the range equal to or greater than 1.62V and equal to or less than 5.5V (YES in step S112), central processing unit CPU sets the "wide voltage range operation mode" in mode register 29 (step S113).

Further, central processing unit CPU starts the processing defined by the vocal communication program. System controller SYSC allows the clock ICLK with the frequency in the range of 1 MHz-30 MHz defined by the vocal communication program to be supplied from main clock circuit 26 to central processing unit CPU, flash memory 23, and the like (step S114).

When the processing defined by the vocal communication program is the reading of data from flash memory 23 (YES in step S115), system controller SYSC performs reading in the "wide voltage range operation mode". In other words, the reading is performed with the clock ICLK in the range of 1 MHz-30 MHz (step S116).

When the processing defined by the vocal communication program is the data programming or data erasing with respect to flash memory 23 (YES in step S117), and only when the external supply voltage Vcc detected by voltage detector 66 is in the range equal to or greater than 1.62V and equal to or less than 3.6V (YES in step S118), sequencer 38 performs the programming or erasing in the "wide voltage range operation mode". In other words, the programming or erasing is performed with the clock FCLK in the range of 1 MHz-15 MHz (step S119).

Central processing unit CPU repeatedly executes the processing from step S115 until the vocal communication program is terminated (YES in step S120).

When data processing device 2 receives an additional request from a user, or it receives no request (YES in step S121), and the external supply voltage Vcc detected by voltage detector 66 is in the range equal to or greater than 1.62V and equal to or less than 5.5V (YES in step S122), central processing unit CPU sets the "low electric power consumption operation mode" in mode register 29 (step S123).

Further, central processing unit CPU starts executing the processing defined by an additional program. For example, the processing such as confirming presence of an incoming call is performed intermittently. System controller SYSC causes the clock ICLK with the frequency in the range of 0 kHz-1 MHz defined by the additional program to be supplied from main clock circuit 26 to central processing unit CPU, flash memory 23, and the like. Further, system controller SYSC performs control so as to operate only regulators PG0, PG1, PG6, and PG7 among regulators PG0-PG7 constituting the power supply circuit (step S124).

When the processing defined by the additional program is the reading of data from flash memory 23 (YES in step S125), system controller SYSC performs the low-speed reading in the "low electric power consumption operation mode". In other words, the reading with clock ICLK in the range of 0 kHz-1 MHz is performed (step S126).

Central processing unit CPU repeatedly executes the processing from step S125 until the additional program is terminated (YES in step S127).

As described above, according to the embodiment of the present invention, the operation voltage and clock frequency of data processing device, and the writing operation with respect to the flash memory can be set easily in accordance with the state of operation of equipment using the data processing device. Further, the number of steps of program for setting such operation can be reduced, so that the code efficiency of the program can be improved.

The embodiments described above are by way of illustration in all aspect and should not to be taken by way of limitation. The scope of the present invention is indicated by the terms of the appended claims, not the description above, and is intended to include the meaning equivalent to the appended claims and all the modification within the scope.

Reference Signs List 1 data processing system; 2 data processing device; 4 sensor; 6 communication unit; 8 timer; 12 battery; 14 terminal; 18 printed circuit board; 21 bus; 23 flash memory; 24 main power supply circuit; 26 main clock circuit; 29 mode register; 30 voltage-down circuit; 31 interface circuit; 32 sense amplifier; 33 Y decoder; 34 flash memory array; 35 X decoder; 36 flash writing clock circuit; 37 intermittent operation timer; 38 sequencer; 39 flash power supply circuit; 40 first voltage-boosting circuit; 41 second voltage-boosting circuit; 51 RAM; 52 ROM; 66 voltage detector; ADC analog-digital converter; CPU central processing unit; DMAC data transfer unit; INTC interruption controller; SCIO serial communication unit; SYSC system controller; HOCO high speed oscillator; LOCO low speed oscillator.

The invention claimed is:

1. A data processing device, comprising:
a central processing unit operating in accordance with a user program;
a register which can be set by a user;
a non-volatile memory; and
a first clock circuit for supplying a first clock to said central processing unit and said non-volatile memory,
said central processing unit setting said register which of a first mode, a second mode, and a third mode said data processing device is to operate in accordance with said user program, and
said first mode allowing operation within a first range in which an external supply voltage is relatively high, and
said second mode allowing operation within a second range in which said external supply voltage includes said first range and a relatively low voltage range, and an upper limit of a frequency of said first clock in said second mode being lower than an upper limit of a frequency of said first clock in said first mode, and
said third mode being a low electric power consumption operation mode, and a frequency of said first clock in said third mode being lower than the frequency of said first clock in said first mode and the frequency of said first clock in said second mode.

2. The data processing device according to claim 1, further comprising:
a sequencer executing processing of programming and erasing with respect to said non-volatile memory only when said external supply voltage is in said first range in said first mode.

3. The data processing device according to claim 1, further comprising:
a sequencer executing processing of programming and erasing with respect to said non-volatile memory only when said external supply voltage is in said second range and equal to or less than a predetermined voltage lower than an upper limit voltage of said second range in said second mode.

4. The data processing device according to claim 1, further comprising:
a second clock circuit supplying a second clock for programming and erasing with respect to said non-volatile memory in said first mode and said second mode.

5. The data processing device according to claim 1, further comprising:
a sequencer executing processing of programming and erasing with respect to said non-volatile memory, and
wherein said sequencer does not execute the processing of programming and erasing with respect to said non-volatile memory in said third mode.

6. The data processing device according to claim 1, further comprising:
a first voltage-boosting circuit and a second voltage-boosting circuit which generate boosted voltage to be supplied to said non-volatile memory, wherein
said first voltage-boosting circuit generates and outputs said boosted voltage at a time of programming and erasing, and
said second voltage-boosting circuit generates and outputs said boosted voltage only at the time of erasing.

7. The data processing device according to claim 1, further comprising:
a power supply circuit supplying electric power to said non-volatile memory;
a sequencer allowing said power supply circuit to operate intermittently at predetermined time intervals in an operation of reading from said non-volatile memory in said third mode; and
an intermittent operation timer notifying said sequencer with elapse of said predetermined time intervals.

8. A data processing system comprising:
a printed circuit board; and
a data processing device mounted on said printed circuit board, said data processing device including
a central processing unit operating in accordance with a user program;
a register which can be set by a user;
a non-volatile memory; and
a first clock circuit for supplying a first clock to said central processing unit and said non-volatile memory, wherein
said central processing unit setting said register which of a first mode, a second mode, and a third mode said data processing device is to operate in accordance with said user program, and
said first mode allowing operation within a first range in which an external supply voltage is relatively high, and
said second mode allowing operation within a second range in which said external supply voltage includes said first range and a relatively low voltage range, and an upper limit of a frequency of said first clock in said second mode being lower than an upper limit of a frequency of said first clock in said first mode, and
said third mode being a low electric power consumption operation mode, and a frequency of said first clock in said third mode being lower than the frequency of said first clock in said first mode and the frequency of said first clock in said second mode.

* * * * *